US008305375B2

(12) United States Patent
Park et al.

(10) Patent No.: US 8,305,375 B2
(45) Date of Patent: Nov. 6, 2012

(54) METHOD AND APPARATUS FOR PROVIDING SLIDE SHOW BY USING PLURALITY OF IMAGES

(75) Inventors: Hyun-mi Park, Suwon-si (KR); Hyun-joo Kang, Suwon-si (KR); Sung-ho Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1027 days.

(21) Appl. No.: 12/210,443

(22) Filed: Sep. 15, 2008

(65) Prior Publication Data

US 2009/0073161 A1 Mar. 19, 2009

(30) Foreign Application Priority Data

Sep. 18, 2007 (KR) .................. 10-2007-0094781

(51) Int. Cl.
G06F 17/00 (2006.01)
(52) U.S. Cl. ...................... 345/418; 345/419
(58) Field of Classification Search .................. None
See application file for complete search history.

(56) References Cited

U.S. PATENT DOCUMENTS

| 7,746,343 | B1* | 6/2010 | Charaniya et al. ........... 345/428 |
| 2002/0097894 | A1* | 7/2002 | Staas et al. .................... 382/113 |
| 2005/0034077 | A1 | 2/2005 | Jaeger | |
| 2006/0101005 | A1* | 5/2006 | Yang et al. ....................... 707/3 |

FOREIGN PATENT DOCUMENTS

| JP | 2003-288068 A | 10/2003 |
| JP | 2005-6125 A | 1/2005 |
| JP | 2006-121644 A | 5/2006 |
| KR | 2001-0001740 A | 1/2001 |

* cited by examiner

Primary Examiner — Said Broome
Assistant Examiner — Janice Kau
(74) Attorney, Agent, or Firm — Sughrue Mion, PLLC

(57) ABSTRACT

A method of providing a slide show includes selecting one of a plurality of images in which geographic position information is set, marking a plurality of positions corresponding to the plurality of images on a map based on geographic position information and outputting the map, setting an image search range on the map based on a position on the map, which corresponds to the selected image, and providing the slide show by using images corresponding to positions on the map, which belong to the set image search range.

20 Claims, 4 Drawing Sheets

410

520

510

METHOD AND APPARATUS FOR PROVIDING SLIDE SHOW BY USING PLURALITY OF IMAGES

CROSS-REFERENCE TO RELATED PATENT APPLICATION

This application claims the benefit of Korean Patent Application No. 10-2007-0094781, filed on Sep. 18, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to providing a slide show.

2. Description of the Related Art

One function that is most frequently used in most devices handling images is an ability to view the images in the form of a slide show.

Conventional methods of providing a slide show comprise selecting which images are used to provide the slide show, selecting effects to be applied to the images, e.g., background music, style, theme, and skin, thereby enjoying a slide show determined according to the selections made.

However, since such a conventional method of providing a slide show comprises a user having to select images to be used for the slide show one by one without considering correlation between the images or having to select all images stored in a predetermined folder or storage device when the images are selected to be provided for the slide show, there is much inconvenience experienced by the user.

In addition according to the conventional methods of providing a slide show, if a user wants to add or delete an image, which is to be shown in the slide show, during the slide show, the user must stop the slide show and configure a new slide show, and thus, again, there is much inconvenience experienced by the user.

SUMMARY OF THE INVENTION

The present invention provides a method and apparatus for providing a slide show by using a plurality of images, by which a user can more easily configure the slide show.

According to an aspect of the present invention, there is provided a method of providing a slide show by using a plurality of images, the method including: selecting one of the plurality of images in which geographic position information is set; marking a plurality of positions corresponding to the plurality of images on a map based on the geographic position information and outputting the map; setting an image search range on the map based on a position on the map, which corresponds to the selected image; and providing the slide show by using images corresponding to positions on the map, which belong to the set image search range.

The outputting may further includes marking the number of images corresponding to each of the plurality of positions and at least one of the corresponding images on the map and outputting the map.

The outputting may include marking a first position, which is a position on the map corresponding to the selected image, and a second image, which is a position farthest from the first position, using a first color and a second color, which are different colors, and marking positions between the first position and the second position by using gradated colors between the first color and the second color according to respective distances from the first position.

The outputting may further include outputting a state control window for setting the image search range, and the state control window may display a total number of images and a number of images corresponding to each of positions within the set image search range currently marked on the map.

The state control window may be formed in the form of a bar including a pointer for graphically showing the number of images corresponding to positions within the set image search range currently marked on the map from among the total number of images.

One end of the state control window may be displayed with a first color, which is a predetermined color, the pointer may be displayed with a second color, which is different from the first color, and a section between the one end of the state control window and the pointer may be displayed by using gradated colors between the first color and the second color.

The method may further comprise calculating a distance between each of a plurality of positions on the map and the position on the map, which corresponds to the selected image, wherein the setting of the image search range comprises setting the image search range by inputting a distance from the position on the map, which corresponds to the selected image, in the state control window.

The setting of the image search range may comprise setting the image search range by moving the pointer to a predetermined position in the state control window.

The method may further comprise if the image search range is set narrower than a currently set image search range in the setting of the image search range, magnifying and re-outputting the currently output map, and if the image search range is set wider than the currently set image search range in the setting of the image search range, reducing and re-outputting the currently output map.

According to another aspect of the present invention, there is provided an apparatus for providing a slide show by using a plurality of images, the apparatus comprising: an input unit receiving a signal for selecting one of the plurality of images in which geographic position information is set; an output unit marking a plurality of positions corresponding to the plurality of images on a map based on the geographic position information and outputting the map; a search range setting unit setting an image search range on the map based on a position on the map, which corresponds to the selected image; and a slide show forming unit providing the slide show by using images corresponding to positions on the map, which belong to the set image search range.

According to another aspect of the present invention, there is provided a computer readable recording medium storing a computer readable program for executing a method providing a slide show by using a plurality of images, the method comprising: selecting one of the plurality of images in which geographic position information is set; marking a plurality of positions corresponding to the plurality of images on a map based on the geographic position information and outputting the map; setting an image search range on the map based on a position on the map, which corresponds to the selected image; and providing the slide show by using images corresponding to positions on the map, which belong to the set image search range.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other features of the present invention will become more apparent by describing in detail exemplary embodiments thereof with reference to the attached drawings in which.

DETAILED DESCRIPTION OF THE INVENTION

The present invention will be described in detail by explaining embodiments of the invention with reference to the attached drawings.

Figure 1:
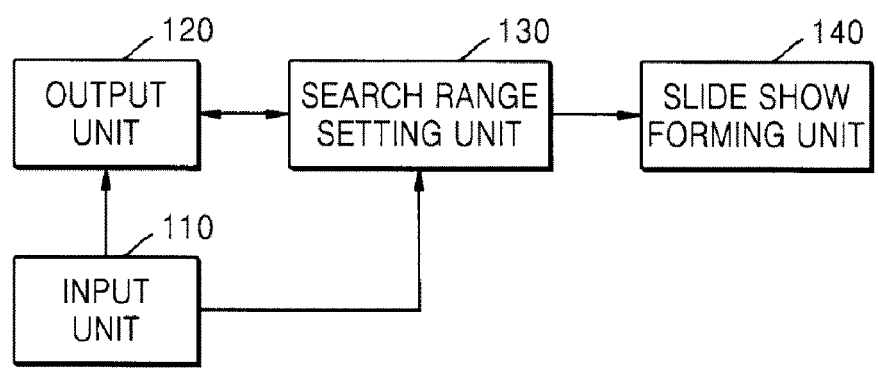
FIG. 1 is a block diagram of an apparatus for providing a slide show by using a plurality of images according to an embodiment of the present invention.

FIG. 1 is a block diagram of an apparatus for providing a slide show by using a plurality of images according to an embodiment of the present invention.

Referring to FIG. 1, the apparatus for providing a slide show by using a plurality of images according to the current embodiment of the present invention includes an input unit 110, an output unit 120, a search range setting unit 130, and a slide show forming unit 140.

The input unit 110 receives a signal for selecting one of a plurality of images in which geographic position information is set.

In this case, a user can input the signal for selecting an image into the input unit 110 using an external input device, such as a keyboard or a mouse.

The geographic position information indicates position information, such as latitude, longitude, geographical name, and address, allocated to a corresponding image. In the current embodiment, in order to allow the user to select images for forming a slide show based on correlations between geographic positions allocated to images, geographic position information can be previously set for each image.

For example, if there is an image of the Pompidou Center, latitude and longitude information, i.e., 48° 52'N and 2° 20'E, of Paris France, an address of the Pompidou Center, or the geographical name, i.e., Paris France, can be allocated to the image as geographic position information of the image.

One image is selected using the input unit 110 in order to allow the user to more conveniently form a slide show by allowing the user to select images having a geographical correlation with the selected image at the same time.

Meanwhile, the user can input a signal for selecting one of a plurality of images when a slide show is initially formed or a signal for selecting an image currently output to a screen during a slide show.

Figure 2:
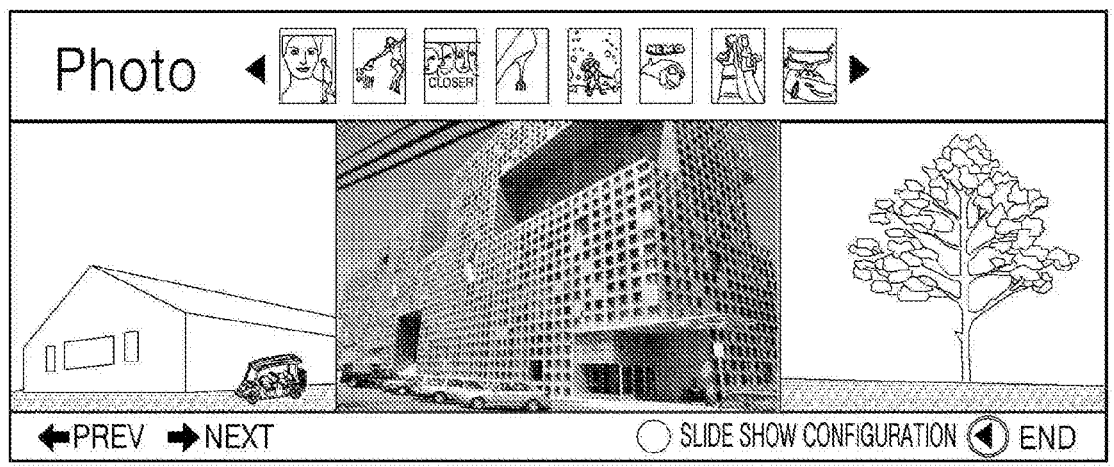
FIGS. 2 and 3 are diagrams for describing an operation of an input unit according to an embodiment of the present invention.
Figure 3:
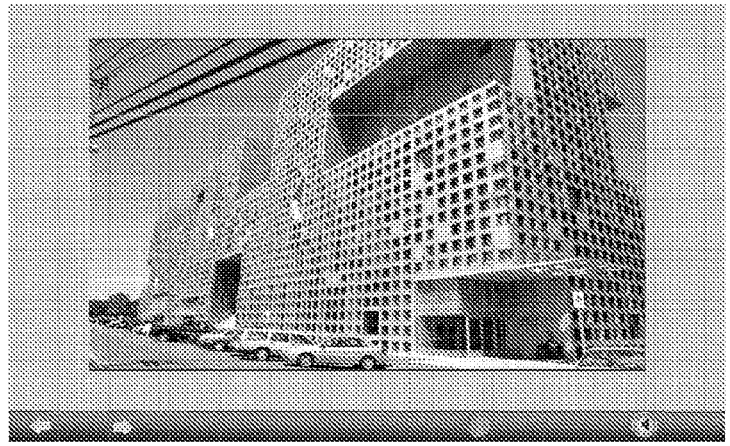

FIGS. 2 and 3 are diagrams for describing an operation of the input unit 110 according to an embodiment of the present invention.

FIG. 2 illustrates a case in which a slide show is initially formed, showing a screen configured in order to allow the user to select one of a plurality of images. The plurality of images are displayed in the upper side of the screen, and three magnified images from among the plurality of images are displayed in the lower side of the screen.

In FIG. 2, if the user clicks a "prev" or "next" button, the three images displayed in the lower side of the screen are replaced with previous or subsequent images, and if the user clicks an "end" button, the current slide show ends.

If the user clicks a "slide show configuration" button, the user can select an image placed in the center of the three images displayed in the lower side of the screen as an image for forming a new slide show.

FIG. 3 illustrates a case in which an image is selected during a slide show.

In FIG. 3, if the user clicks a "prev" or "next" button, a previous or subsequent image of an image currently displayed on a screen from among a plurality of images included in the slide show is displayed on the screen, and if the user clicks an "end" button, the current slide show ends.

If the user clicks a "slide show configuration" button, the user can select the image currently displayed on the screen as an image for forming a new slide show.

Referring back to FIG. 1, the output unit 120 marks a plurality of positions corresponding to the plurality of images on a map based on the geographic position information and outputs the map.

An operation of the output unit 120 will be described later with reference to FIGS. 4 and 5.

The search range setting unit 130 sets an image search range on the map output by the output unit 120 based on a position on the map, which corresponds to the image selected by the input unit 110.

An operation of the search range setting unit 130 will be described later with reference to FIGS. 4 and 5.

The slide show forming unit 140 provides a slide show by using images corresponding to positions on the map, which belong to the image search range set by the search range setting unit 130.

Figure 4:
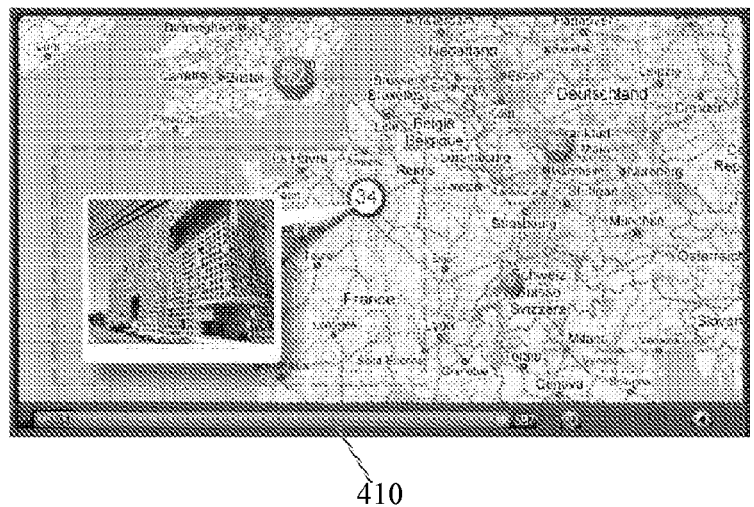
FIGS. 4 and 5 are diagrams for describing an operation of an output unit according to an embodiment of the present invention.
Figure 5:
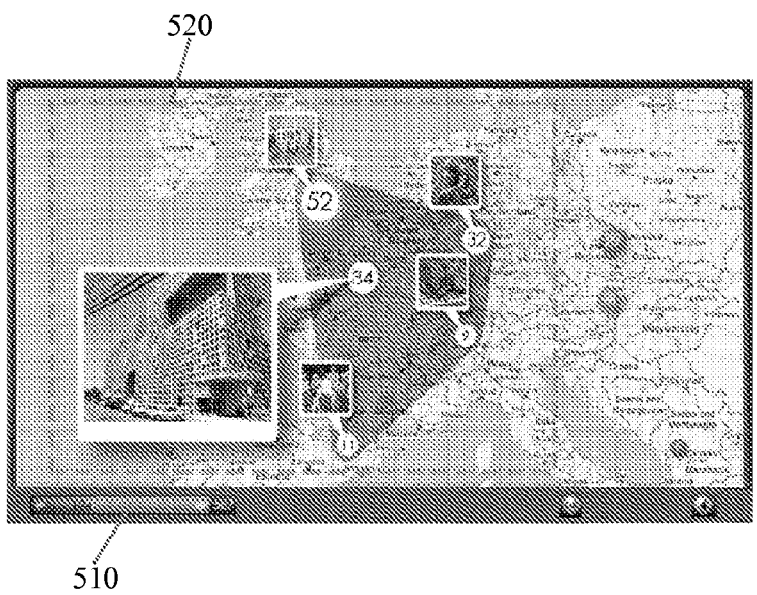

FIGS. 4 and 5 are diagrams for describing an operation of the output unit 120 according to an embodiment of the present invention.

Referring to FIG. 4, in an image search range 420 indicated by a dotted line, an image selected by the input unit 110 is displayed and a position on the map, which corresponds to the selected image, is marked with a numeral 34. Even though the position on the map is marked with a circle, marking is not limited thereto and can use any kind of figure or symbol. For convenience of description, it is assumed hereinafter that a position on the map is marked with a circle.

The numeral 34 denotes the number of images corresponding to the position. For example, the number of images corresponding to the position of the circle marked with 34 is 34 including the image of the Pompidou Center, which is the image selected by the input unit 110.

In addition, circles marked with numerals 52, 9, and 32 exist on the map of FIG. 4, the numerals indicating the number of images corresponding to respective positions. In this case, the circles marked with numerals have various colors determined based on a distance from a reference position, which is the position of the circle marked with numeral 34.

For example, if a color of the circle marked with 34, which corresponds to the reference position, is purple, and a color of the circle marked with 32, which corresponds to a position farthest from the reference position, is yellow, circles placed within the distance between the reference position and the circle marked with 32 at intermediate positions, have a gradated color between purple and yellow.

That is, if the circles shown in FIG. 4 are arranged in the order of a distance closer to the reference position, the circles are arranged in the order of numerals 52, 9, and 32. Since the circle marked with 52 is relatively closer to the reference position, the circle marked with 52 has a color close to purple, and the circle marked with 9 is relatively closer to the circle marked with 32, the circle marked with 9 has a color close to yellow.

Colors are assigned to respective positions in order to allow the user to intuitively detect how far each position marked on the map is from the reference position. In this case, a position marked with a color closer to a color indicating the reference position can be determined to be closer to the reference position.

The apparatus for providing a slide show by using a plurality of images according to an embodiment of the present invention may further include a distance calculator (not shown) calculating a distance between each of a plurality of positions on the map and the reference position. In this case, the output unit 120 marks a color corresponding to each of the plurality of positions on the map based on the calculation result of the distance calculator and outputs the map.

In the lower left side of FIG. 4, a state control window 410 for determining an image search range 420 set by the search range setting unit 130 is displayed. That is, in the current embodiment, if the user inputs a predetermined value in the state control window 410 by using the input unit 110, the search range setting unit 130 sets the image search range 420 based on the value input in the control window 410.

In this case, the value input in the control window 410 may be a numeral, a geographical name, or a predetermined control signal value.

For example, if the state control window 410 shown in FIG. 4 is configured in the form for inputting a numeral, the user can input a numeral indicating a distance from the reference position in the state control window 410 in order to set an image search range. In more detail, in the case where the reference position is Paris France, if the user inputs 500 Km in the state control window 410, the search range setting unit 130 can determine a range including positions within a radius of 500 Km from Paris, France, which is the reference position, as the image search range 420.

A geographical name may be input in the state control window 410. For example, in the case where the reference position is Paris, France, if the user inputs Germany in the state control window 410, the search range setting unit 130 can determine the image search range 420 on the map based on a distance from Paris to Germany.

As described above, by forming a slide show by determining the image search range 420 based on a distance from a reference position, which is a position corresponding to an image selected by using the input unit 110, the user can easily form the slide show by selecting images having a geographical correlation with the image selected by the user. In the examples described above, if the user wants to form a slide show by using images having a relatively higher geographical correlation with the image selected by the user, the user inputs a shorter distance or a geographical name placed at a position closer to the reference position in the state control window 410.

Referring to FIG. 4, the state control window 410 formed using graphics is displayed in order to determine the image search range 420 more intuitively. The state control window 410 shown in FIG. 4 is in the form of a bar including a pointer for graphically displaying the number of images corresponding to positions on the map, which are in the image search range 420.

Numerals 587 and 34 are displayed in the state control window 410 shown in FIG. 4, 587 denoting the total number of images and 34 denoting the number of images corresponding to positions on the map, which belong to the image search range 420. In the case of FIG. 4, since only the position of the circle marked with 34 is included in the image search range 420, 34 indicating the number of images corresponding to the position of the circle marked with 34 is displayed in the state control window 410.

In the lower right side of FIG. 4, a "slide show restart" button is shown, and if the user clicks the "slide show restart" button, the slide show forming unit 140 forms a slide show by using the 34 images included in the image search range 420 and provides the slide show to the user.

FIG. 5 illustrates a case of an image search range 520 having a wider range than the image search range 420 shown in FIG. 4.

While the image search range 420 shown in FIG. 4 includes only the position of the circle marked with 34, the image search range 520 shown in FIG. 5 includes positions of circles marked with 34, 52, 32, 9, and 11. Thus, the number of images within the image search range 520, which is displayed in a state control window 510 shown in FIG. 5, increases from 34 in FIG. 4 to 124 in FIG. 5. In addition, the positions on the map, which are included in the image search range 520, have images corresponding to the respective positions. In this case, an image corresponding to each position is one of a plurality of images corresponding to each position.

Since the image search range 520 shown in FIG. 5 includes 5 positions, each a different distance from the reference position, the user can reduce the number of images included in the image search range 520 by 5 levels by using the state control window 510, and accordingly, the image search range 520 can be reduced by 5 levels.

For example, the image search range 520 currently set in FIG. 5 includes the positions of the circles marked with 34, 52, 32, 9, and 11, and the image search range 520 can be reduced to a range including only the circle marked with 34.

In more detail, in the case of the image search range 520 including 5 positions, the number of images included in the image search range 520 is 124 as displayed in the state control window 510. However, if a control signal for decreasing the image search range 520 by one level is input to the state control window 510, the position of the circle marked with 11, which is a position farthest from the reference position, is excluded from the image search range 520. Thus, in this case, the number of images included in the image search range 520, which is displayed in the state control window 510, is 113 obtained by subtracting 11 from 124.

However, the image search range 520 can be reduced or extended from a currently set range.

A method of inputting a value for determining the image search range 520 in the state control window 510 will now be described.

First, the user can adjust the image search range 520 by inputting a control signal for controlling the pointer of the state control window 510 by using "left" and "right" buttons of an external input device, such as a keyboard.

For example, when the number of images included in the image search range 520 is set as 124, once the user clicks the "left" button of the external input device, the position of the circle marked with 11, which is a position farthest from the reference position, is excluded from the image search range 520, and the number of images included in the image search range 520, which is displayed in the state control window 510, is changed to 113.

Second, the user can adjust the image search range 520 by inputting a control signal for controlling the pointer of the state control window 510 by using an external input device, such as a mouse.

For example, the user can input a control signal for placing the pointer on an arbitrary position of the state control window 510 in the state control window 510 by using the mouse. The state control window 510, which has received the control signal, displays the number of images included in the image search range 520 corresponding to the position of the pointer, and the search range setting unit 130 changes the image search range 520 in response to the control signal input to the state control window 510 by using the input unit 110.

The state control window 510 shown in FIG. 5 can be displayed using gradated colors. For example, the left end of the state control window 510 shown in FIG. 5 can be displayed in purple, the right end can be displayed in yellow, and a section between both ends can be displayed in gradated colors between purple and yellow.

As described above, if the state control window 510 is displayed in gradated colors, the number of images included in the image search range 520 and distance correlations between the positions included in the image search range 520 on the map can be intuitively detected.

For example, when a color of the circle marked with 11 is yellow and a color of the circle marked with 9 is orange, if the image search range 520 includes the position of the circle marked with 11, a color of the pointer is displayed as yellow. However, if the image search range 520 is reduced and includes the position of the circle marked with 9 without including the position of the circle marked with 11, the color of the pointer is displayed as orange. In more detail, the number of images included in the image search range 520, which is displayed in the state control window 510, is reduced from 124 to 113 in the above example, and a section displayed in the form of a gradation from orange to yellow disappears.

In this case, since the color of the pointer of the state control window 510 is the same as the color of the circle placed farthest from the reference position on the map, the user can intuitively detect a distance included in the image search range 520 on the map by only viewing the color of the pointer of the state control window 510.

However, the state control window 510 can be formed in the form of a bar or any form for receiving an input for determining the image search range 520 and is not limited to the example described above.

Comparing the map shown in FIG. 5 with the map shown in FIG. 4, the map shown in FIG. 5 is displayed in a reduced form in comparison to the map shown in FIG. 4. This is the map re-output to display relatively more positions on the map of the screen due to a wider range of the image search range 520 shown in FIG. 5 in comparison to the image search range 420 shown in FIG. 4.

As described above, the output unit 120 according to an embodiment of the present invention re-outputs a currently displayed map by magnifying the map when the image search range 520 is set narrower than a currently set image search range and re-outputs the currently displayed map by reducing the map when the image search range 520 is set wider than the currently set image search range. If the map is magnified and output, the map can be represented in more detail.

The method of providing a slide show by using a plurality of images, which has been described above, can be applied to a case where the plurality of images have a geographical position correlation and a case where a correlation between additional information allocated to the plurality of images by modifying a slide show providing method according to an embodiment of the present invention.

Figure 6:
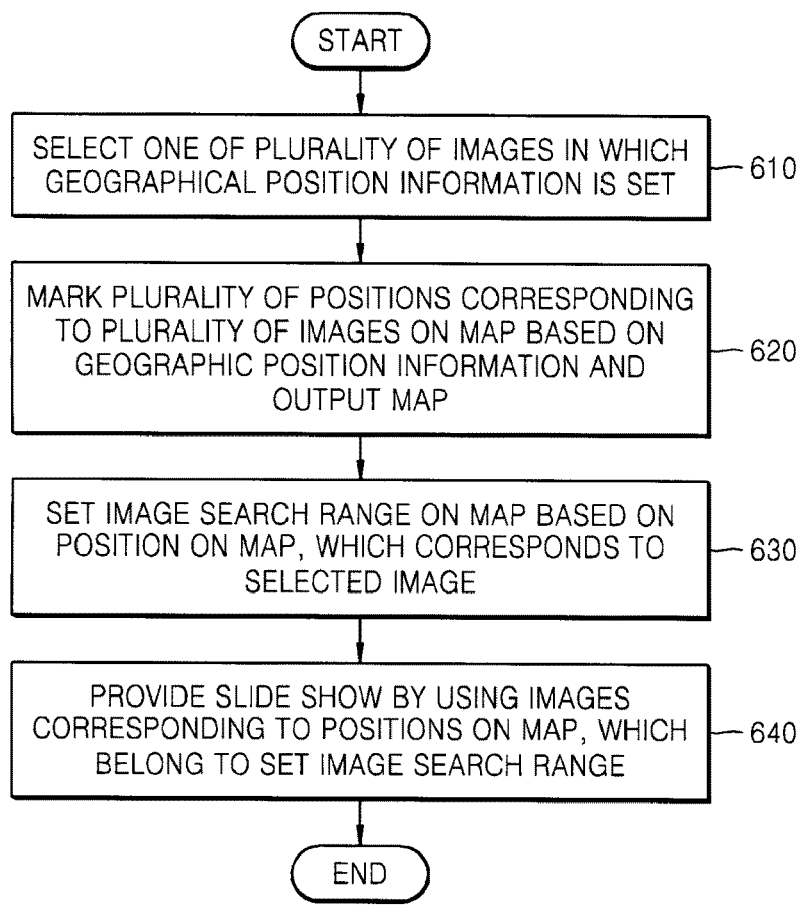
FIG. 6 is a flowchart illustrating a method of providing a slide show by using a plurality of images according to an embodiment of the present invention.

FIG. 6 is a flowchart illustrating a method of providing a slide show by using a plurality of images according to an embodiment of the present invention.

Referring to FIG. 6, one of a plurality of images in which geographical position information is set is selected in operation 610.

In operation 620, a plurality of positions corresponding to the plurality of images is marked on a map based on the geographic position information and the map is output.

In operation 630, an image search range is set on the map based on a position on the map, which corresponds to the selected image.

In operation 640, a slide show is provided by using images corresponding to positions on the map, which belong to the set image search range.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. In another exemplary embodiment, the computer readable recording medium may include carrier waves (such as data transmission through the Internet).

As described above, according to the present invention, by selecting one of a plurality of images in which geographic position information is set, marking a plurality of positions corresponding to the plurality of images on a map based on the geographic position information, outputting the map, setting an image search range on the map based on a position on the map, which corresponds to the selected image, and providing a slide show by using images corresponding to positions on the map, which belong to the set image search range, a user can more conveniently generate a slide show.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of providing a slide show, performed by an slide show apparatus, by using a plurality of images, the method comprising: selecting, based on a first input by a user, an image of the plurality of images contained in the apparatus, the plurality of images comprising geographic position information; marking a plurality of positions corresponding to the plurality of images on a map based on the geographic position information and outputting the map on a display unit of the apparatus; setting, based on a second input by a user, a search range on the map based on a position on the map of the selected image, wherein the search range may be reduced with one of a plurality of levels which can be adjustable by the user; and providing the slide show on the display unit by using images corresponding to positions on the map within the set search range from the point of the selected image on the map.

2. The method of claim 1, wherein the outputting comprises marking, a number of images corresponding to each of the plurality of positions and at least one of the corresponding images on the map and outputting the map.

3. The method of claim 1, wherein the outputting comprises marking a first position on the map corresponding to the selected image, and a second position at a first distance from the first position, using a first color and a second color, respectively, and marking intermediate positions within the first distance from the first position by using gradated colors between the first color and the second color according to respective distances of the intermediate positions from the first position.

4. The method of claim 1, wherein the outputting comprises outputting a control window for setting the search range, and the control window displays a total number of images and a number of images corresponding to each of the positions within the set search range currently marked on the map.

5. The method of claim 4, wherein the control window is formed in the form of a bar including a pointer for graphically showing the number of images corresponding to the positions within the set search range currently marked on the map from among the total number of images.

6. The method of claim 5, wherein one end of the control window is displayed with a first color, which is a predetermined color, the pointer is displayed with a second color, which is different from the first color, and a section between the one end of the control window and the pointer is displayed by using gradated colors between the first color and the second color.

7. The method of claim 4, further comprising calculating a distance between each of the plurality of positions on the map and the position on the map of the selected image, wherein the search range is determined based on the second input by a user indicating a distance from the position on the map of the selected image, in the control window.

8. The method of claim 5, wherein the search range is determined based on a position of the pointer moved by a user in the control window.

9. The method of claim 1, further comprising if the search range is set more narrow than a currently set search range, magnifying and re-outputting the currently output map, and if the search range is set wider than the currently set search range, reducing and re-outputting the currently output map.

10. An apparatus for providing a slide show by using a plurality of images, the apparatus comprising: an input unit which receives a first input from a user for selecting an image of the plurality of images contained in the apparatus, the plurality of images comprising geographic position information; an output unit which marks a plurality of positions corresponding to the plurality of images on a map based on the geographic position information and outputs the map; a search range setting unit which sets, based on a second input by a user, a search range on the map based on a position on the map of the selected image, wherein the search range may be reduced with one of a plurality of levels which can be adjustable by the user; and a slide show forming unit implemented by a computer which provides a slide show by using images corresponding to positions on the map within the set search range from the point of the selected image on the map; and a display unit, which displays the map output by the output unit and the slide show formed by the slide show forming unit.

11. The apparatus of claim 10, wherein the output unit marks a number of images corresponding to each of the plurality of positions and at least one of the corresponding images on the map and outputs the map.

12. The apparatus of claim 10, wherein the output unit marks a first position on the map corresponding to the selected image, and a second position at a first distance from the first position, using a first color and a second color, respectively, and marks intermediate positions within the first distance from the first position by using gradated colors between the first color and the second color according to respective distances of the intermediate positions from the first position.

13. The apparatus of claim 10, wherein the output unit outputs a control window for setting the search range, and the control window displays a total number of images and a number of images corresponding to each of the positions within the set search range currently marked on the map.

14. The apparatus of claim 13, wherein the control window is formed, in the form of a bar including a pointer for graphically showing the number of images corresponding to the positions within the set search range currently marked on the map from among the total number of images.

15. The apparatus of claim 14, wherein one end of the control window is displayed with a first color, which is a predetermined color, the pointer is displayed with a second color, which is different from the first color, and a section between the one end of the control window and the pointer is displayed by using gradated colors between the first color and the second color.

16. The apparatus of claim 13, further comprising a distance calculator which calculates a distance between each of the plurality of positions on the map and the position on the map of the selected image.

17. The apparatus of claim 16, wherein the range is determined based on an input by a user indicating a distance from the position on the map of the selected image, in the control window.

18. The apparatus of claim 14, wherein the range is determined based on a position of the pointer moved by a user in the control window.

19. The apparatus of claim 10, wherein if the search range setting unit sets the search range more narrow than a currently set search range, the output unit magnifies and re-outputs the currently output map, and if the search range setting unit sets the search range wider than the currently set search range, the output unit reduces and re-outputs the currently output map.

20. A non-transitory computer readable recording medium storing a computer readable program for executing the method of claim 1.

* * * * *